(12) United States Patent
DeWard et al.

(10) Patent No.: US 8,087,445 B2
(45) Date of Patent: Jan. 3, 2012

(54) SPRING MOTOR AND WINDOW COVERING

(75) Inventors: Joshua L. DeWard, High Point, NC (US); Patrick Eugene Foley, Winston-Salem, NC (US); James McCauley, Jamestown, NC (US); Daniel R. Pierson, Greensboro, NC (US); Alejandro Martin Rossato, Greensboro, NC (US)

(73) Assignee: Newell Window Furnishings, Inc., High Point, NC (US)

( * ) Notice: Subject to any disclaimer, the term of this patent is extended or adjusted under 35 U.S.C. 154(b) by 144 days.

(21) Appl. No.: 12/489,975

(22) Filed: Jun. 23, 2009

(65) Prior Publication Data

US 2010/0319860 A1    Dec. 23, 2010

(51) Int. Cl.
E06B 9/322    (2006.01)

(52) U.S. Cl. .................. 160/170; 160/173 R; 242/372; 242/407

(58) Field of Classification Search .................. 160/170, 160/171; 242/372, 407, 474.8, 478.1, 481.9
See application file for complete search history.

(56) References Cited

U.S. PATENT DOCUMENTS

| | | | |
|---|---|---|---|
| 2,420,301 A | 11/1944 | Cusumano | |
| 2,824,608 A | 2/1958 | Etten | |
| 3,310,099 A | 3/1967 | Hunter et al. | |
| 4,557,309 A | 12/1985 | Judkins | |
| 4,647,488 A | 3/1987 | Schnebly et al. | |
| 5,178,200 A | 1/1993 | Hagen | |
| 5,482,100 A | 1/1996 | Kuhar | |
| 5,531,257 A | 7/1996 | Kuhar | |
| 5,533,559 A | 7/1996 | Judkins | |
| 5,611,386 A | 3/1997 | Wang | |
| 5,680,891 A | 10/1997 | Prince | |
| 5,915,447 A | 6/1999 | Lassen | |
| 6,024,154 A | 2/2000 | Wang et al. | |
| 6,029,734 A * | 2/2000 | Wang et al. .................. 160/170 |
| 6,079,471 A | 6/2000 | Kuhar | |
| 6,149,094 A | 11/2000 | Martin et al. | |
| 6,234,236 B1 | 5/2001 | Kuhar | |
| 6,283,192 B1 | 9/2001 | Toti | |
| 6,289,965 B1 | 9/2001 | Ruggles | |
| 6,293,329 B1 | 9/2001 | Toti | |
| 6,318,661 B1 | 11/2001 | Martin et al. | |
| 6,330,899 B1 | 12/2001 | Ciuca et al. | |
| 6,474,394 B2 | 11/2002 | Kuhar | |
| 6,601,635 B2 | 8/2003 | Ciuca et al. | |
| 6,644,372 B2 | 11/2003 | Judkins | |
| 6,644,373 B2 | 11/2003 | Palmer | |
| 6,644,375 B2 | 11/2003 | Palmer | |
| 6,648,050 B1 | 11/2003 | Toti | |

(Continued)

*Primary Examiner* — Blair M. Johnson
(74) *Attorney, Agent, or Firm* — Dennis J. Williamson; Moore & Van Allen, PLLC

(57) ABSTRACT

The lift motor comprises at least one motor unit releasably connected to at least one spool unit. The spool unit comprises a spool for winding a cord and a gear operatively connected to the spool. The motor unit comprises a spring motor having a gear for engaging the gear of the spool. A window covering comprises a head rail supporting a motor as set forth above that supports a shade panel by the cord. A method of assembling a window covering comprises constructing a head rail having an internal space for receiving a motor. A motor is assembled based on the shade panel to be supported. The motor is inserted into the head rail and the cord is attached to or near the bottom or top of the shade panel.

29 Claims, 16 Drawing Sheets

U.S. PATENT DOCUMENTS

| | | |
|---|---|---|
| 6,675,861 B2 | 1/2004 | Palmer et al. |
| 6,684,930 B2 | 2/2004 | Palmer et al. |
| 6,725,897 B2 | 4/2004 | Palmer |
| 6,761,203 B1 * | 7/2004 | Huang .................... 160/170 |
| 6,823,925 B2 | 11/2004 | Militello et al. |
| 6,889,741 B1 | 5/2005 | Cheng et al. |
| 6,957,683 B2 * | 10/2005 | Toti ........................ 160/170 |
| 7,802,608 B2 * | 9/2010 | Anderson et al. ............. 160/170 |
| 2002/0011315 A1 | 1/2002 | Ciuca et al. |
| 2002/0033240 A1 | 3/2002 | Toti |
| 2002/0088562 A1 | 7/2002 | Palmer |
| 2003/0024656 A1 | 2/2003 | Ciuca |
| 2003/0111191 A1 | 6/2003 | Ciuca et al. |
| 2003/0196765 A1 | 10/2003 | Ciuca et al. |
| 2004/0094274 A1 | 5/2004 | Judkins |
| 2004/0129390 A1 | 7/2004 | Toti |
| 2004/0177933 A1 | 9/2004 | Hillman et al. |
| 2005/0045279 A1 | 3/2005 | Zhang et al. |
| 2005/0109471 A1 | 5/2005 | Strand |
| 2009/0159219 A1 * | 6/2009 | Wen et al. ................... 160/170 |

* cited by examiner

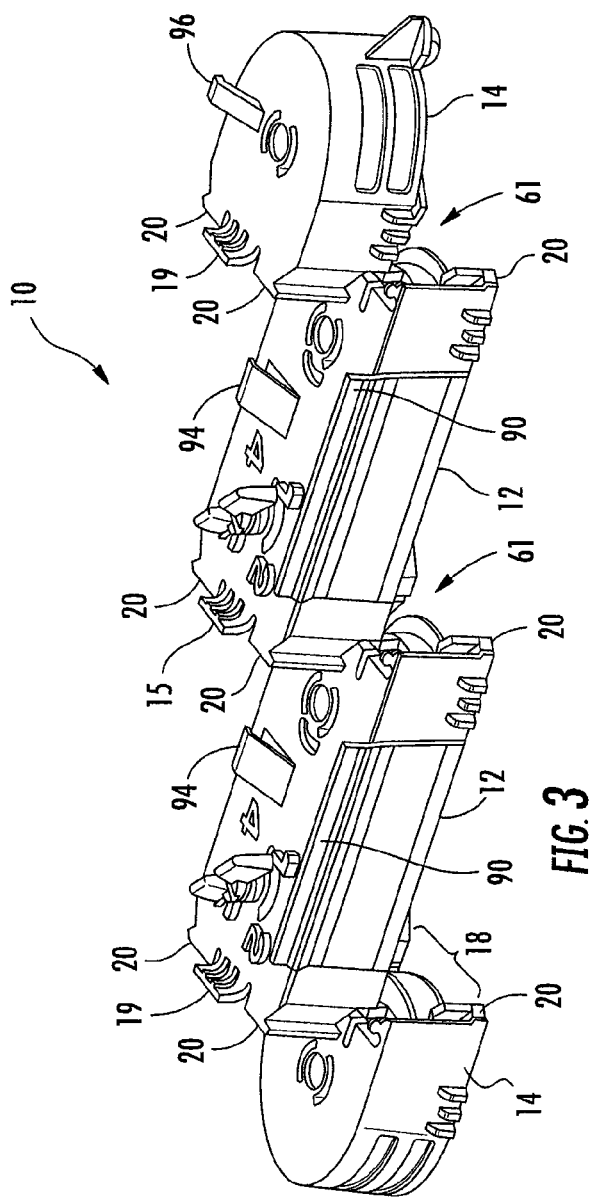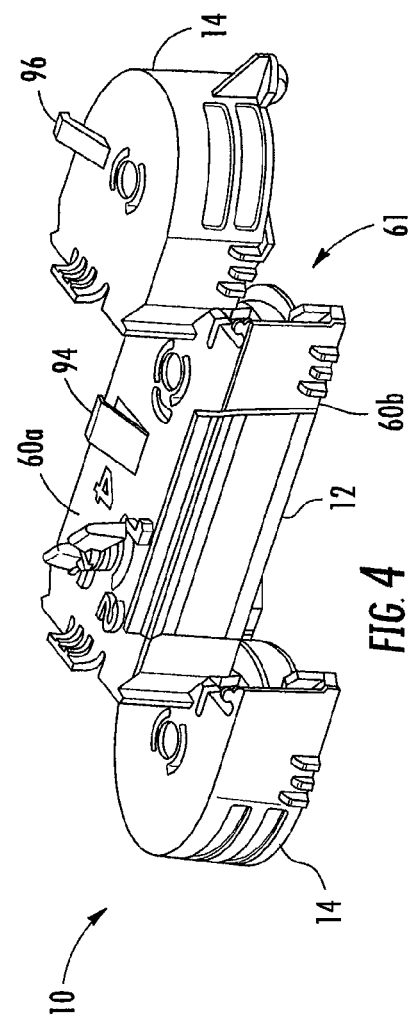

SPRING MOTOR AND WINDOW COVERING

The invention relates generally to spring motors and more particularly to a spring motor and window covering.

BACKGROUND OF THE INVENTION

Window coverings such as shades and blinds are known that typically comprise a head rail that supports a shade panel such as a cellular shade that can be raised and lowered relative to the head rail to uncover and cover an architectural feature such as a window. Traditionally, the shade panels are lifted by lift cords that are manually pulled and released by the user to raise and lower the shade panel. Cordless shades are also known that use a motor to assist in raising and lowering the shade panel. In one cordless shade a spring motor is used that is designed to hold the shade panel in a desired position and to assist the user in raising and lowering the shade panel. In operation, the user pushes or pulls on the shade panel itself, typically by pushing or pulling on a bottom rail attached to the bottom of the shade panel, to raise or lower the shade panel. The spring motor counterbalances the weight of the shade panel such that the motor assists the user in raising the shade and supports the shade in the raised position after the user releases the shade. Such spring motors are described in U.S. Pat. No. 6,149,094, dated Nov. 21, 2000 and U.S. Pat. No. 6,318,661, dated Nov. 20, 2001.

SUMMARY OF THE INVENTION

The lift motor comprises at least one motor unit releasably connected to at least one spool unit. The spool unit comprises a spool for winding a cord and a spool gear operatively connected to the spool. The motor unit comprises a spring motor having a drum gear for engaging the spool gear when the motor unit is connected to the spool unit. A window covering comprises a head rail supporting a motor as set forth above. A shade panel is supported from the head rail by the cord. A method of assembling a window covering comprises constructing a head rail having an internal space dimensioned to receive a motor. A motor is assembled having a spool unit for winding a cord that is connected to at least one motor unit. The number of motor units is selected based on the shade panel to be supported. The motor is snap fit into the head rail and the cord is attached near the bottom or top of the shade panel.

BRIEF DESCRIPTION OF THE DRAWINGS

FIG. 3 is a perspective view of an embodiment of the spring motor of the invention.

FIG. 4 is a perspective view of the embodiment of the spring motor in a different configuration.

DETAILED DESCRIPTION OF EMBODIMENTS OF THE INVENTION

Figure 1:
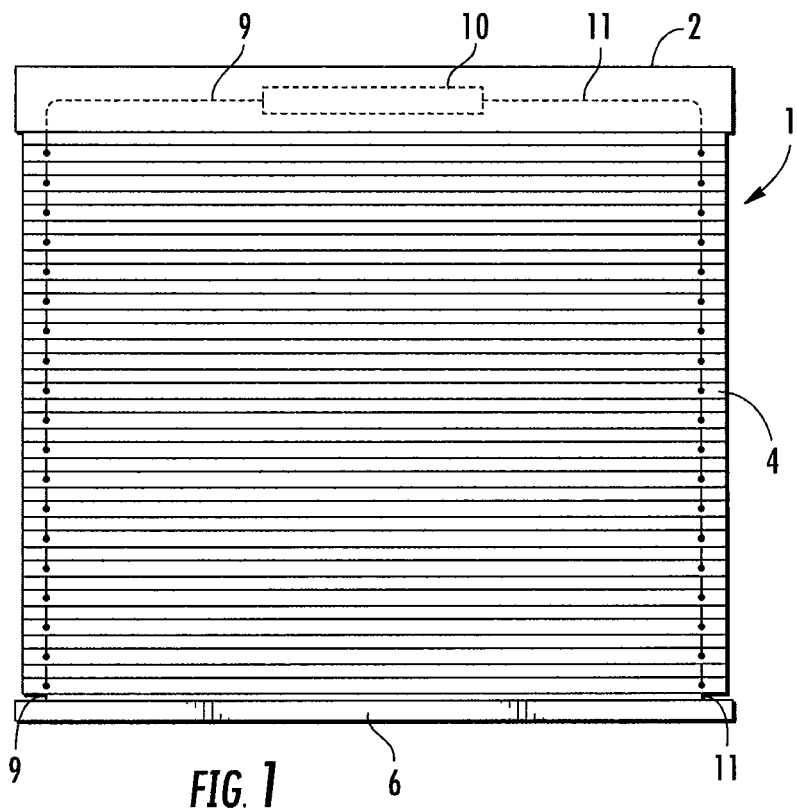
FIGS. 1 and 2 are front views of exemplary window coverings in which the spring motor of the invention may be used.
Figure 2:
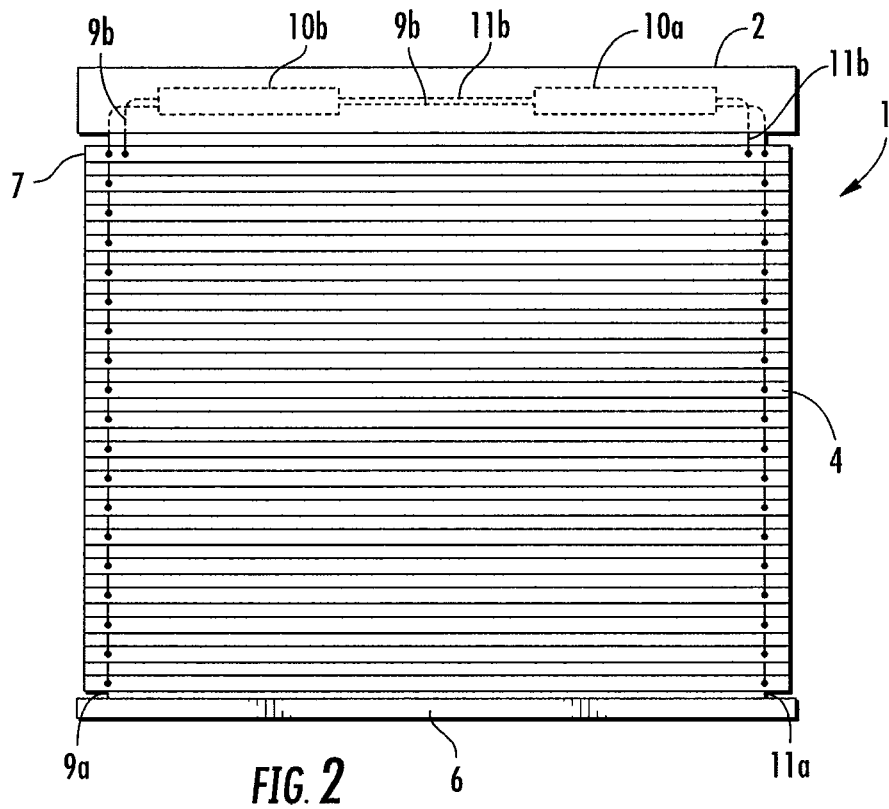

Referring to FIG. 1 an embodiment of a window covering in which the spring motor may be used is shown generally at 1 and comprises a head rail 2 supporting a flexible shade panel 4 that has a bottom rail 6 located at the bottom edge of the panel 4. The front of the head rail 2 and the bottom rail 6 may be covered in the shade panel fabric such that they are hidden from view. The flexible shade panel 4 may comprise cellular blinds, woven shades, natural shades, Roman shades, hobbled shades, looped shades, slatted blinds or the like. The head rail 2 and shade panel 4 are typically dimensioned to coincide with the dimensions of the architectural feature with which the window covering is intended to be used. While the invention is referred to as a window covering and may be used primarily to cover windows, it is to be understood that the window covering may be used to cover any architectural feature such as a window, door, opening, alcove or the like. The upper end of the panel 4 may be secured to or near the head rail 2. Lift cords 11 and 12 extend from the spring motor 10 located in the head rail 2 to the bottom rail 6 of the shade panel 4 as will hereinafter be explained. While the illustrated embodiment shows two lift cords, a greater number of lift cords may be used depending upon the size, weight and geometry of the window covering. Referring to FIG. 2, the spring motor 10 of the invention may also be used with top down/bottom up and/or day/night shades where the top of the shade panel 4 moves relative to the head rail 2. In such an arrangement two lift motors 10a and 10b are mounted in head rail 2. The lift cords 9a and 11a from motor 10a are connected to the bottom of shade panel 4 or to bottom rail 6 while lift cords 9b and 11b from motor 10b are connected to the top edge of shade panel 4 or to a top rail 7.

Referring to FIGS. 3 and 4 an embodiment of the spring motor of the invention is shown generally at 10. The spring motor 10 comprises at least one motor unit 12 and one spool unit 14 connected to one another. The motor 10 of the invention is modular such that multiple motor units 12 and spool units 14 may be connected to one another to create an assembled motor 10. In one embodiment the motor 10 comprises a single motor unit 12 connected to two spool units 14 where each spool unit winds one lift cord, FIG. 4. Typically, a window covering includes at least two lift cords each lift cord supporting one end of the panel where each lift cord is supported by a spool unit 14. If greater lifting force is required, for example, for a larger and heavier window covering, additional motor units 12 can be added between the two spool units 14 to increase the lifting and holding power of the motor 10. In the embodiment of FIG. 3, two motor units 12 are shown although additional motor units 12 may be added. If a window covering requires more than two lift cords, for example, for larger window coverings, multiple motors 10 can be used in the same head rail with each motor 10 supporting at least one lift cord. Further, two motors 10 may also be used in top down/bottom up or day/night window coverings where both the top of the shade panel and the bottom of the shade panel can be raised and lowered, as shown in FIG. 2. In a top down/bottom up or day/night window covering one motor 10 is connected by lift cords near the top of the shade panel 4 and a second motor 10 is connected by lift cords near the bottom of the shade panel 4.

Figure 19:
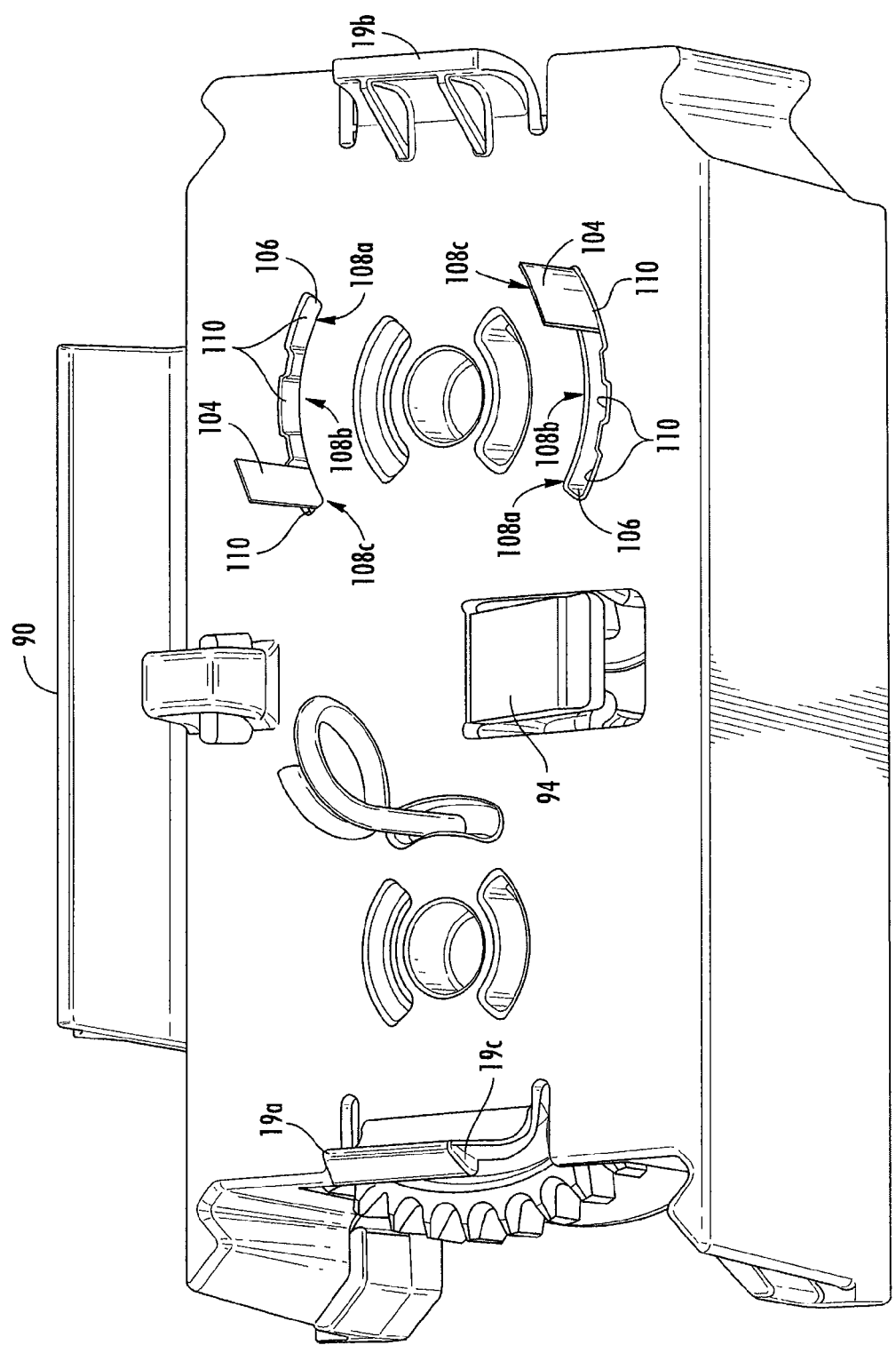
FIG. 19 is a perspective view of the motor unit of FIG. 18.

Referring to FIGS. 3 through 5, 7, 9 and 10, spool unit 14 comprises a housing 15 having a top wall 15*a* and a side wall 15*b* that extends from the top wall to create an interior space for receiving a spool 16. The interior space is open on its bottom side to allow the components of the spool unit 14 to be assembled. The spool unit 14 is arranged in the head rail 2 such that the open bottom of the motor 10 is closed by the bottom of the head rail as will hereinafter be described. The side wall 15*b* extends around a portion of the spool 16 but a gap 18 is maintained in the side wall 15*b* to allow the spool unit 14 to operatively engage the motor unit 12 as will hereinafter be described. The side wall 15*b* terminates in a quick-connect coupling comprising dove tail joints 20 that engage mating dove tail joints formed on the motor units 12 to secure the motor units 12 to the spool units 14. The dove tail joint of one unit is slid into connection with the dove tail joint of the adjacent unit. The quick-connect coupling allows the units to be connected to one another quickly and easily without the use of tools or separate fasteners. The motor units 12 and spool units 14 may also be provided with locks 19 to secure the units together. The locks 19 comprise a deformable flange 19*a* that engages a corresponding flange 19*b* on the adjacent unit such that the flanges interlock as shown in FIG. 19. The flexible flange 19*a* includes a lip 19*c* that traps flange 19*b*. Thus, the motor 10 is modular in construction with modular spool units and motor units that can easily be connected together to create a complete motor.

Figure 5:
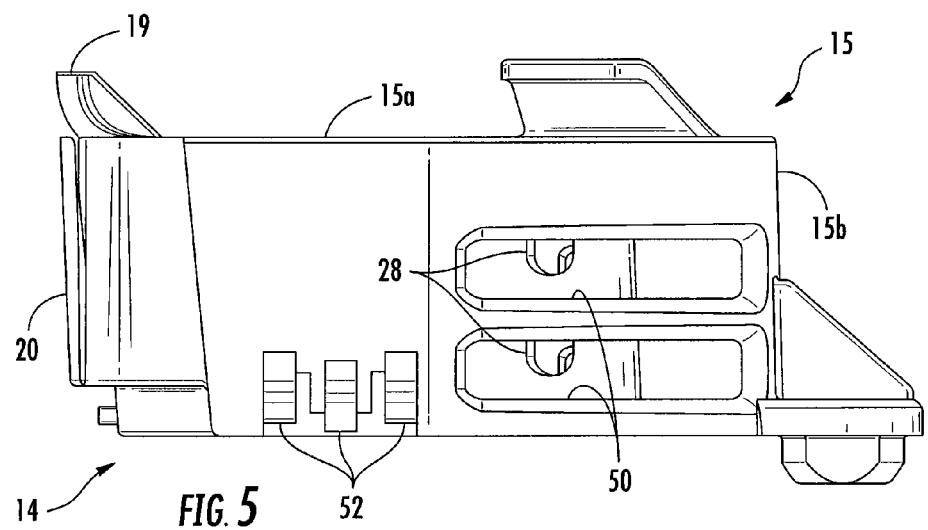
FIG. 5 is a side view of the spool unit used in the motor of FIG. 2.
Figure 7:
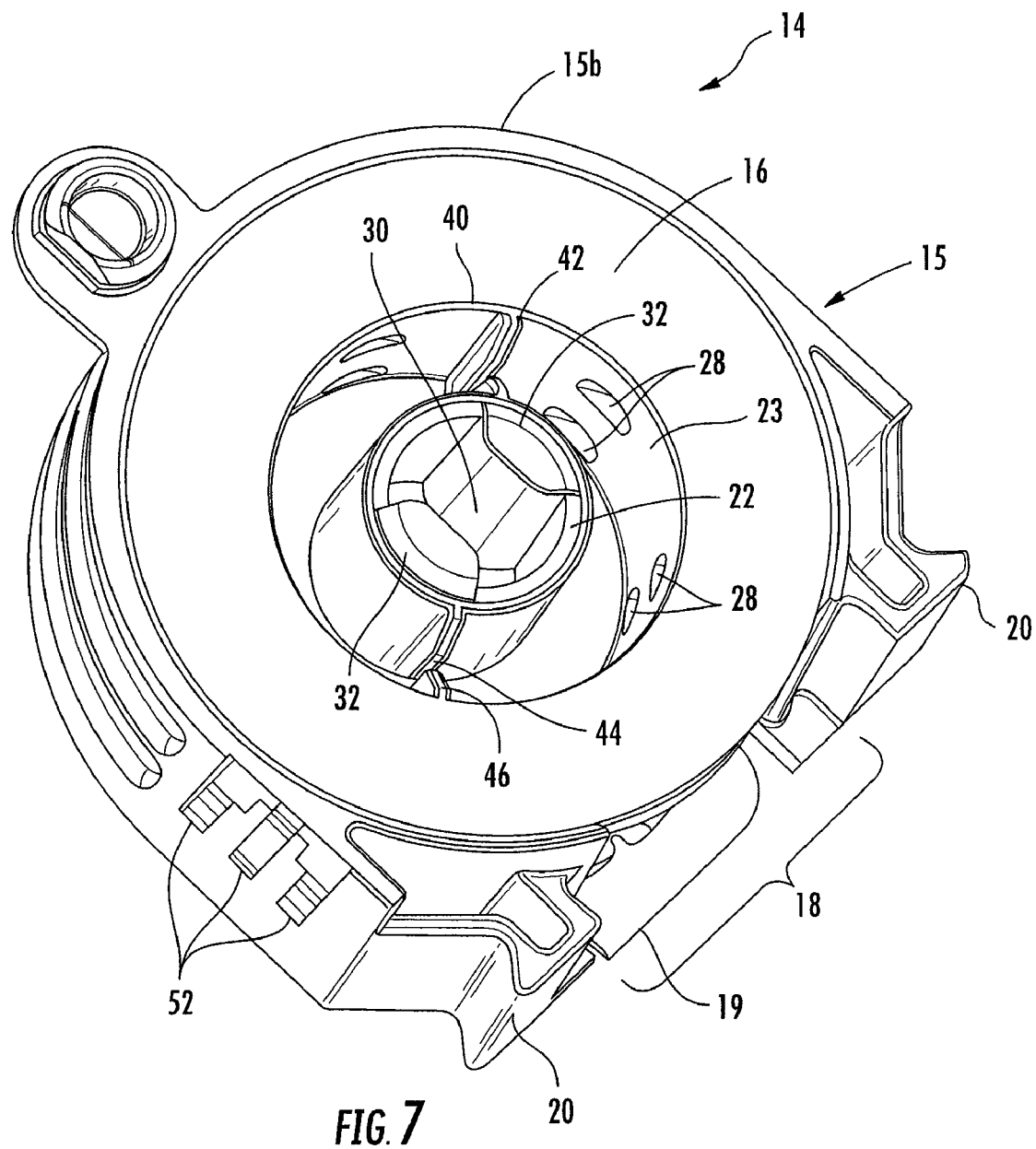
FIG. 7 is a bottom perspective view of the spool unit used in the motor of FIG. 2.
Figure 10:
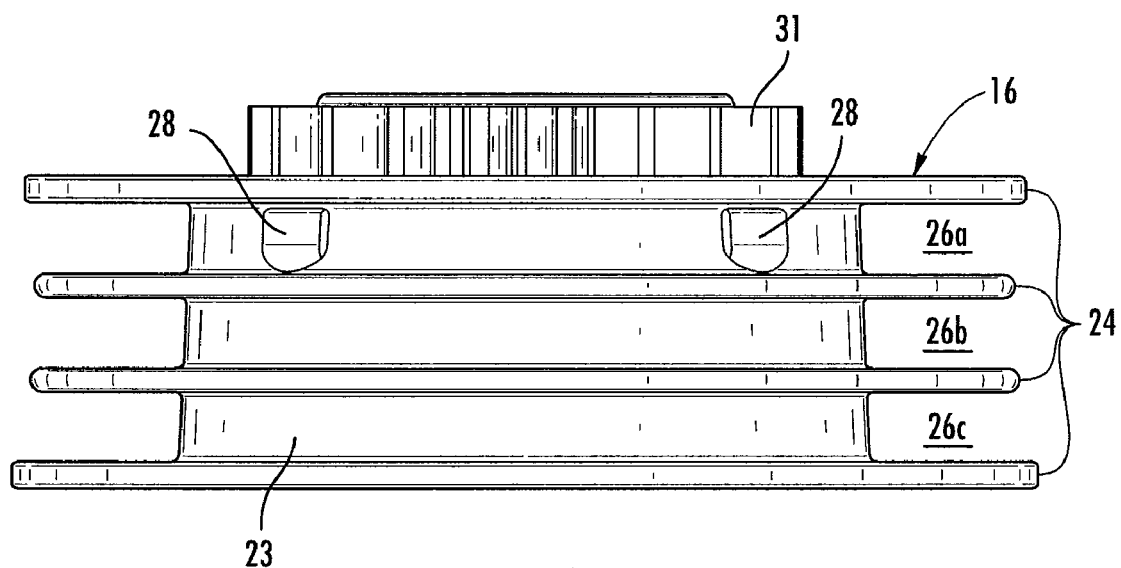
FIG. 10 is a side view of the spool used in the spool unit.

Referring to FIGS. 5, 7 and 10 spool 16 includes a central hub 22 and a cylinder 23 spaced from the hub. A plurality of flanges 24 extend from the cylinder 23 to create a plurality of annular channels spaced over the height of the cylinder. In the illustrated embodiment four flanges 24 are used, two end flanges formed at the ends of cylinder 22 and two interior flanges, to create three channels 26*a*, 26*b* and 26*c*. The lift cord is tied to the spool 16 and extends out of one of apertures 28 and into the top channel 26*a*. As the spool rotates to retract the cord, the cord is wound in the top channel 26*a* until the top channel is filled with cord. The cord then spills over the top interior flange and into the middle channel 26*b*. Gravity and the tension on the cord facilitate the drop of the cord from one channel to the adjacent lower channel. The process is repeated to fill the third channel 26*c*. The use of the segmented spool ensures that the entire height of the cylinder is used to wind the cord and avoids the problem with existing spools where the cord tends to wind at the bottom of the spool. The spool of the invention allows longer cords to be used such that larger shade panels can be used as cordless shades. The top of the spool 16 is formed with a spool gear 31 that is engaged by a mating drum gear of the motor unit 12 as will hereinafter be described.

Figure 6:
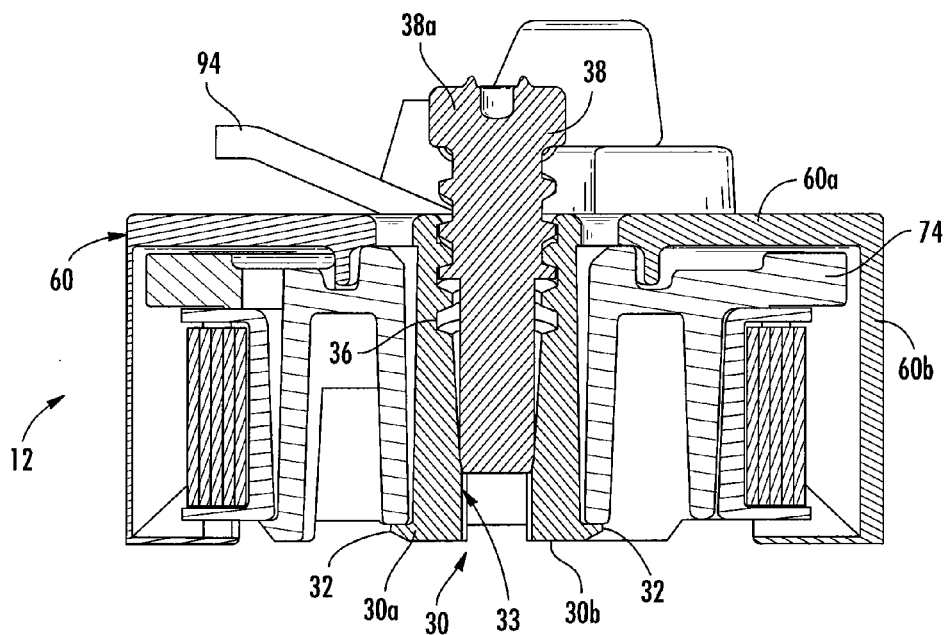
FIG. 6 is a side section view of the motor unit used in the motor of FIG. 2.
Figure 8:
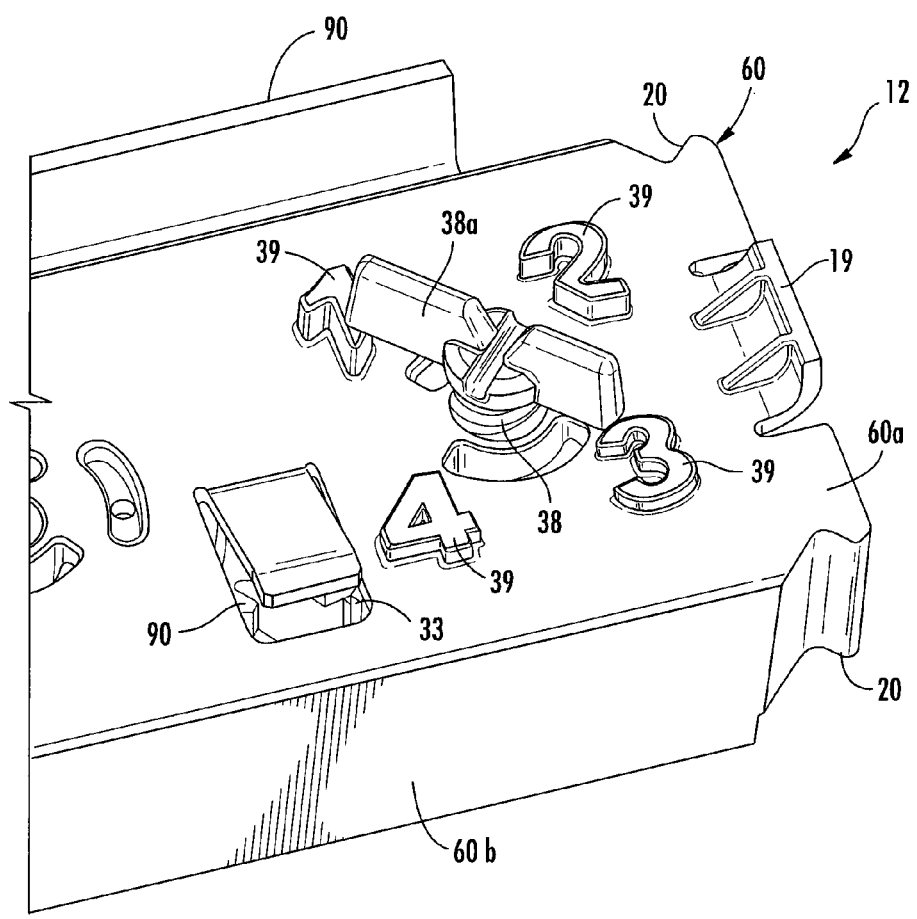
FIG. 8 is a top perspective view of another embodiment of the spool motor unit used in the motor of FIG. 2.

Referring to FIGS. 6 and 8 spool 16 drum 74 is supported on a post 30 that extends from the top wall 60*a*. Post 30 is a split post having a first section 30*a* separated from a second section 30*b* by axially extending slots 33. The top edges of sections 30*a* and 30*b* are formed with flanges 32 that form camming surfaces such that the drum 74 can be inserted over post 30 by pressing hub 22 against flanges 32 to force sections 30*a* and 30*b* toward one another such that the spool 16 fits onto post 30. The post 30 returns to its original shape such that flanges 32 trap the hub 22 to retain drum 74 in housing 60. A threaded bore 36 is formed on the internal surfaces of the post 30 that receives a threaded screw 38. The threaded screw 38 has a conical shape that tapers from a narrower distal end toward a wider end proximate the screw head 38*a*. As the screw 38 is threaded into the threaded bore 36 the tapered screw 38 forces the post sections 30*a* and 30*b* farther apart the farther the screw 38 is screwed into the bore 36. As the post 30 expands, the friction between the post 30 and the internal surface of hub 22 increases such that the drum 74 becomes harder to rotate. The adjustment of the friction between the drum 74 and the post 30 is used to accommodate variations in the motor units 12 such that the screw 38 may be rotated to adjust the resistance to the force actually exerted by the spring motor 10 on the lift cords 9, 11 to ensure that the forces are sufficient to adequately hold, and assist the raising and lowering of, the shade panel during operation of the window covering. While the threaded screw 38 is shown operatively connected to drum 74, the threaded screw 38 may be operatively connected to spool 16 of spool unit 16 (FIG. 7).

Figure 9:
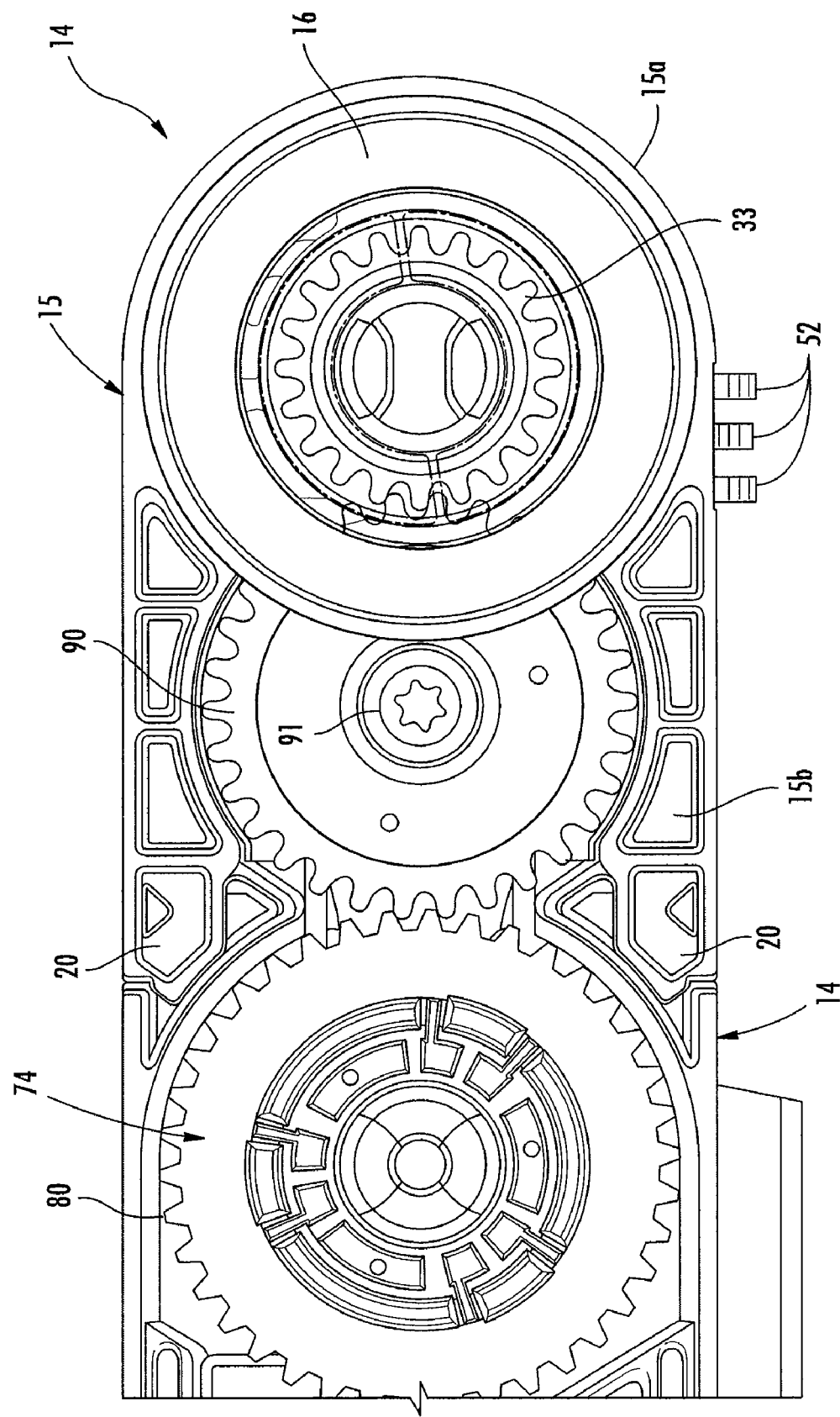
FIG. 9 is a bottom view of the spool unit of FIG. 8.

Referring to FIGS. 8 and 9 in one embodiment, set points are used such that the screw 38 will tend to be held at fixed angular set points. The set points can be created by providing areas 39 of increased interference between the screw head 38*a* and the housing 60. In the illustrated embodiment the set points are raised areas 39 of the housing 60 that frictionally and/or mechanically engage head 38*a*. FIG. 8 shows a system in which four set points are used where the friction introduced into the system can be adjusted to one of the four predetermined settings. In an alternate embodiment the set points may be eliminated such that the screw 38 is continuously adjustable to any point.

Referring to FIGS. 5 and 7, to attach the cord to the spool the cord may be inserted through one of apertures 28 formed in hub 22 in the uppermost channel 26*a*. A knot is tied in the end of the cord and the cord is inserted into a slot 40 formed in a rib 42 located on the inside of the spool 16. Then cord is then wrapped halfway around the hub 22 and is inserted into a second slot 44 formed in a second rib 46 located inside the spool.

After the cord is wound on the spool 16, the spool is inserted into housing 15 as previously described. The free end of the cord is extended outside of housing 15 through one of two slots 50 formed in the side wall 15*b*. The slot 50 the cord passes through depends on the length of cord used for the particular window covering. After exiting the housing 15 the cord is passed through an aperture in the head rail and is secured to the shade panel. The end of each cord may be connected to the panel, the top rail or the bottom rail. For top down/bottom up shades and day/night shades where two motors 10 are used, the cords may be extended through hook fingers 52 to guide the cord around the housing 15. Additional mechanisms such as guides or pulley wheels may be used to guide the cords through the head rail.

Figure 11:
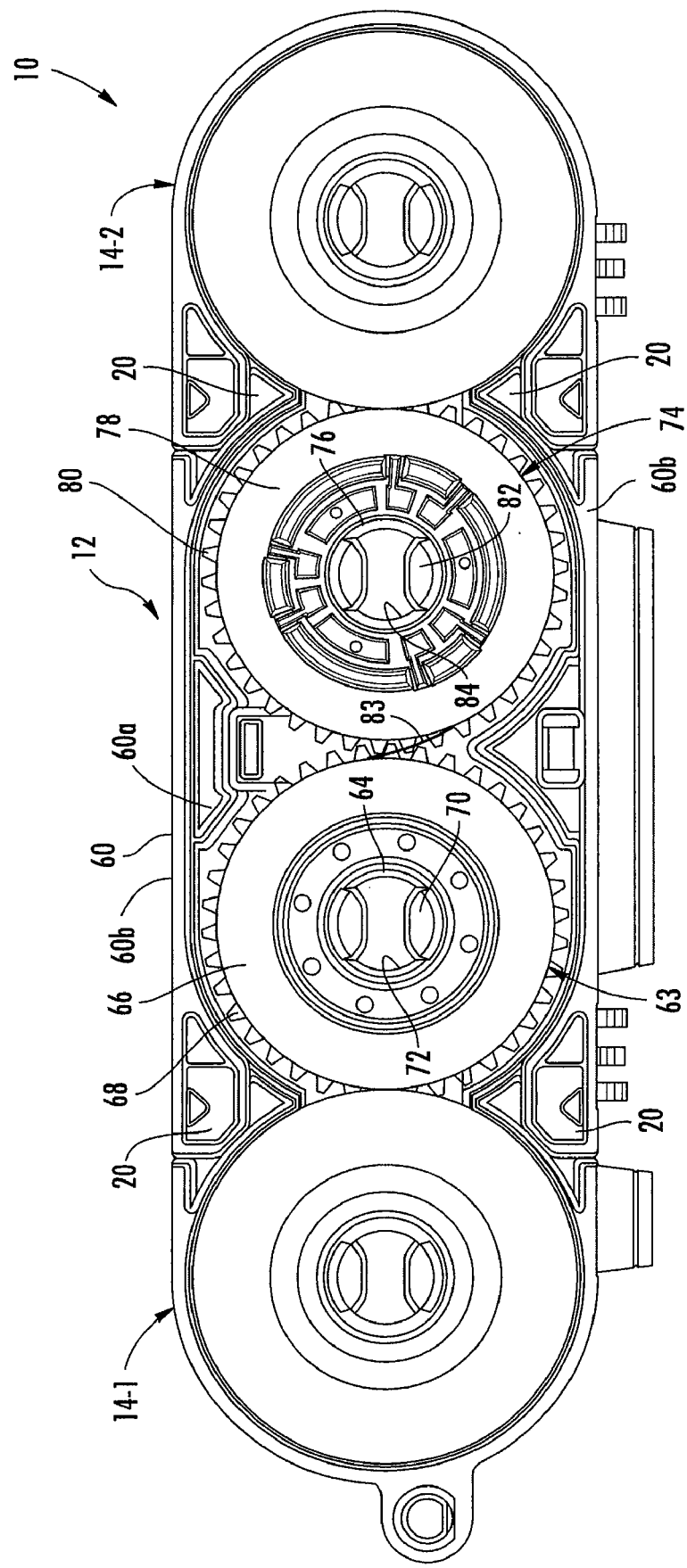
FIG. 11 is a bottom view of the motor unit connected to two spool units.

Referring to FIG. 11, each motor unit 12 comprises a housing 60 having a top wall 60*a* and side walls 60*b* extending from the top wall to create an internal space. The side walls 60*b* are spaced such that an opening 61 (FIGS. 3 and 4) is formed at either end of the motor unit 12 that is substantially coextensive with opening 18 of the spool units 14 such that the motor units 12 can operatively engage the spool units 14. The side walls 60*b* are formed with dove tail joints 20 that engage the dove tail joints 20 on spool units 14. The mating dove tail joints 20 and the locking flanges 19 comprise a quick-connect coupler that allows the motor units and spool units to be quickly and easily connected to one another without the need for tools or separate fasteners.

Figure 16:
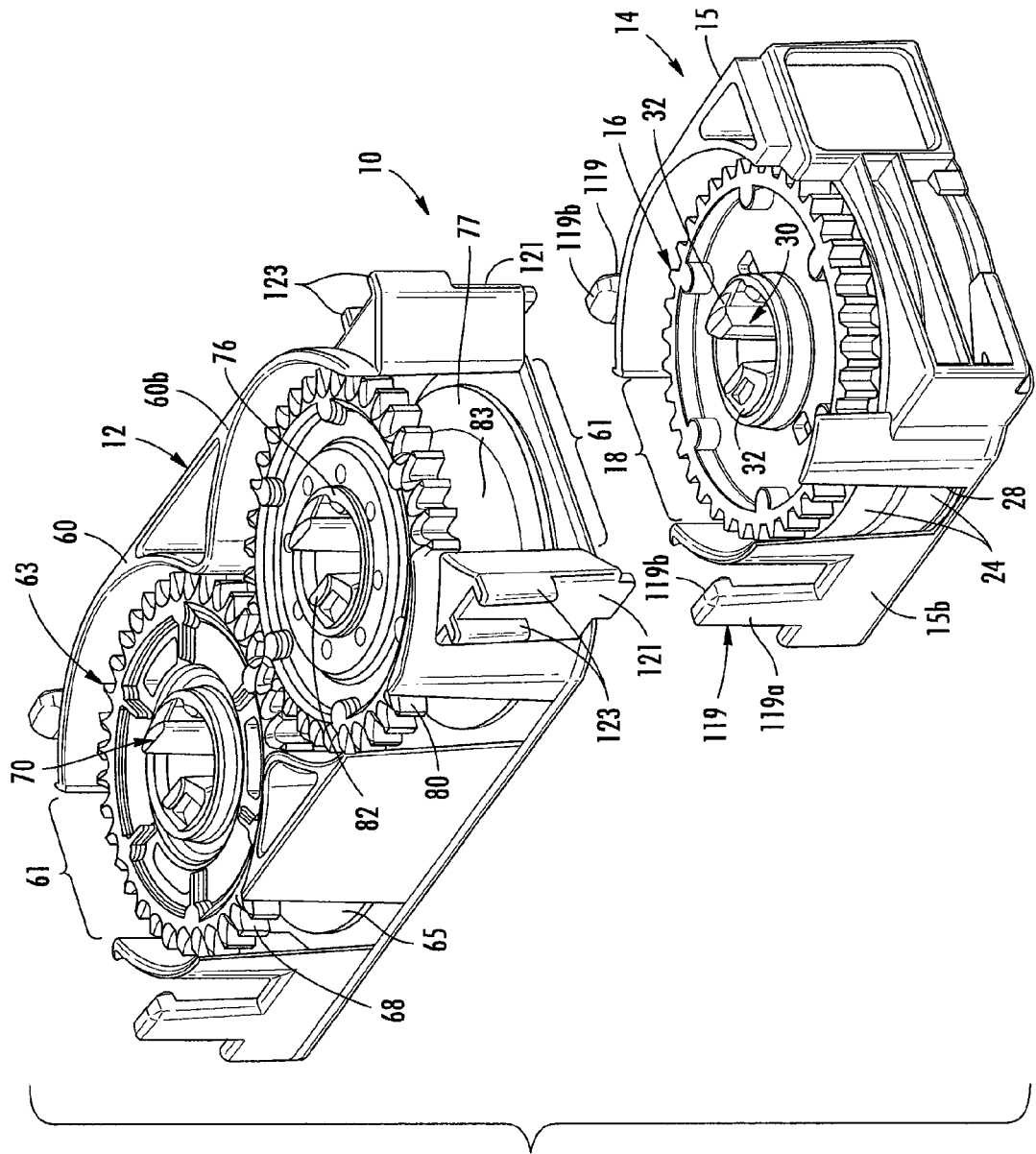
FIGS. 16 and 17 show an alternate embodiment of the coupling between the motor unit and spool unit.
Figure 17:
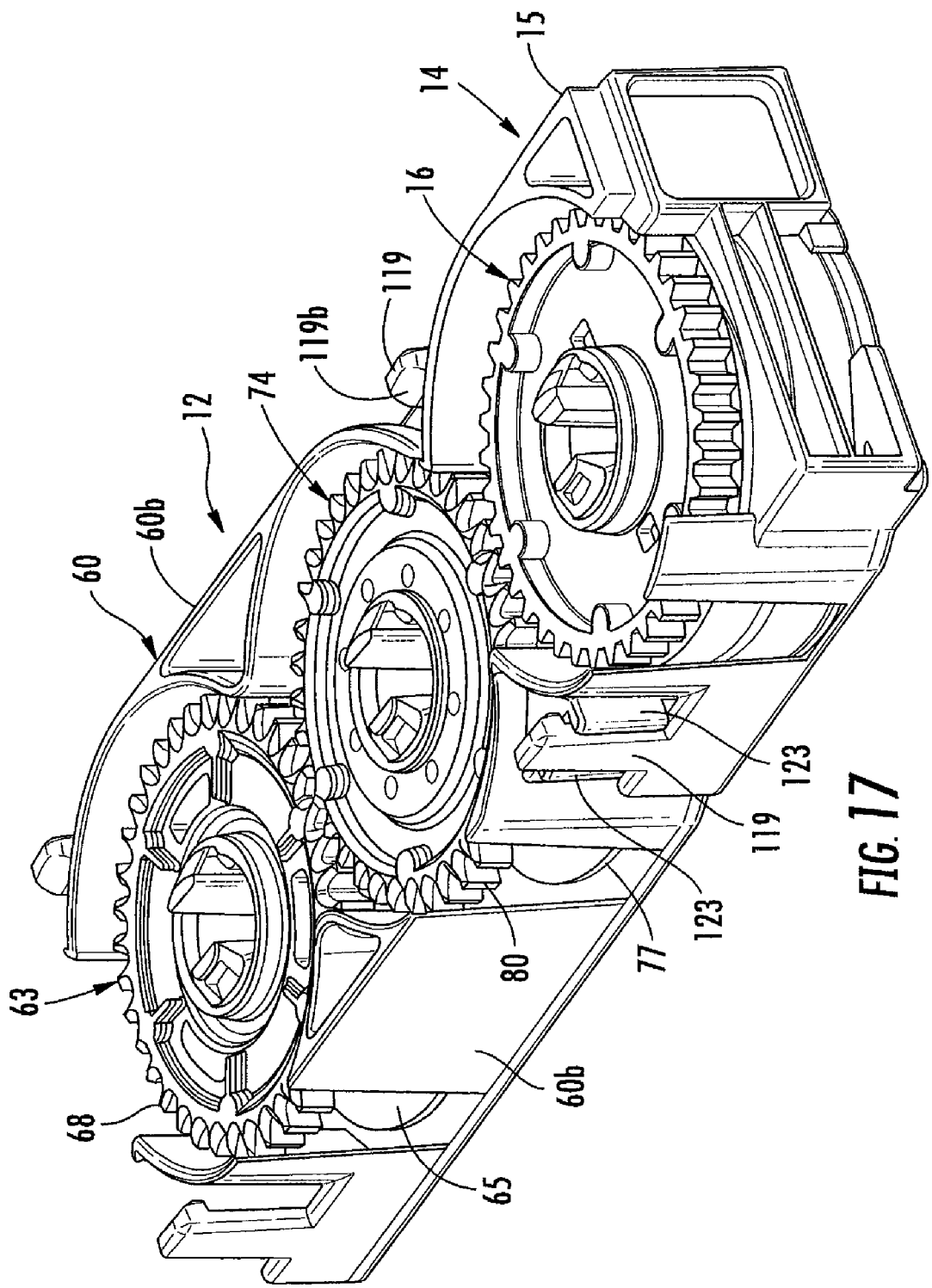

Referring to FIGS. 16 and 17 an alternate embodiment of the quick-connect coupler used to connect the motor units and spool units is shown where like reference numerals are used to identify like components previously described with respect to other embodiments. The connector shown in FIGS. 16 and 17 may be used in place of the dove tail connector shown in the embodiment of FIGS. 3 through 10. The connector comprises a flexible tab 119 that extends from the spool unit adjacent each side of gap 18. Tab 119 includes an elongated body 119a that terminates in a flange 119b that extends substantially normal to body 119a. Motor unit 12 includes a receiving surface 121 adjacent each side of opening 61 that is dimensioned and positioned to be engaged by tab 119. Tabs 119 flex to engage surfaces 21 to clamp the motor housing between the tabs 119. Flanges 119b snap over the top edges of surfaces 121 to prevent the tabs 119 from being pulled laterally away from the motor housing. Retaining members 123 are formed adjacent receiving surface 121 and are spaced to closely capture the tabs and prevent the tabs from moving laterally along the motor housing. Once the tabs 119 are snapped in position on the adjacent housing the motor and spool units are locked together and can only be separated by flexing the tabs 119 away from the housing. Other quick-connect mechanisms for releasably connecting the units together may also be used.

A first output drum 63 comprises a hub 64 having a radially outwardly extending top flange 65 and bottom flange 66 defining a spool dimensioned to receive a spring 83. A radially outwardly extending toothed drum gear 68 is formed adjacent the top flange. A split post 70, similar to post 30, extends from top wall 60a through opening 72 in hub 64 about which drum 63 rotates. Each motor unit 12 also comprises a storage drum 74 comprising a hub 76 having a radially outwardly extending top flange 77 and bottom flange 78 defining a spool dimensioned to receive spring 83. A radially outwardly extending toothed drum gear 80 is formed on the storage drum 74 adjacent the top flange. Split post 82 extends through an opening 84 in hub 76 about which drum 74 rotates. The gears 68 and 80 engage with one another such that drums 63 and 74 rotate together.

Motor unit 12 further includes a spring 83 which is operatively connected between output drum 63 and storage drum 74. Spring 83 is a prestressed strip of flat spring metal having a natural or relaxed state in which it forms a tightly wound coil which is mounted on the storage drum 74. The opposite end of spring 83 is attached to output drum 63 so as to be wound thereabout counter to the relaxed curvature of the spring. When spring 83 is wound onto output drum 63 from storage drum 74 the spring force tends to rewind spring 83 back onto the storage drum 74. Accordingly, as spring 83 is progressively transferred from storage drum 74 to output drum 63 by rotation of the latter, the spring provides a desired constant or variable resisting force which, upon release of the force causing rotation of output drum 63, rewinds spring 83 on storage drum 74 and reverses rotation of the drums.

Figure 18:
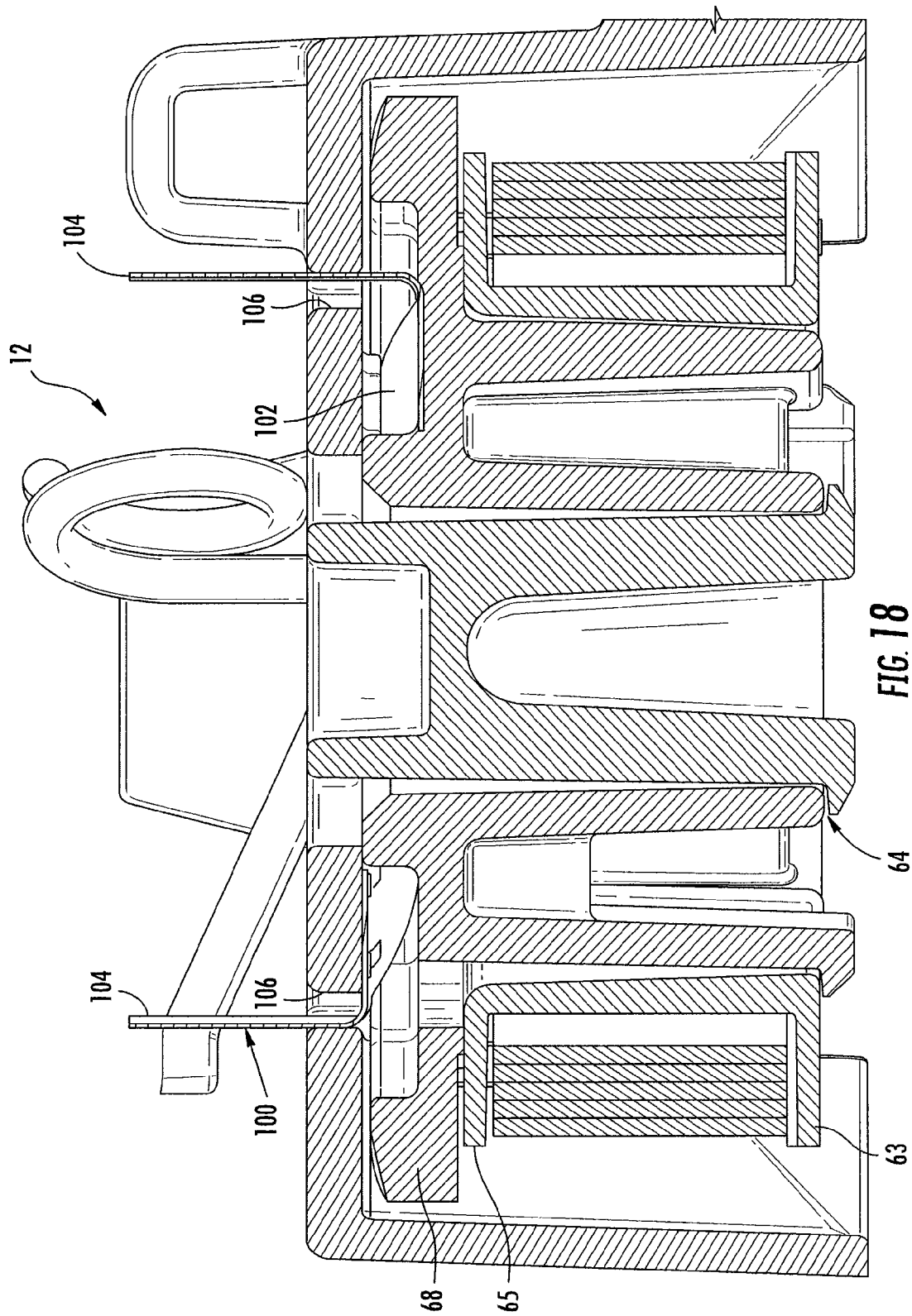
FIG. 18 is a section view showing an alternate embodiment of the motor unit.
Figure 20:
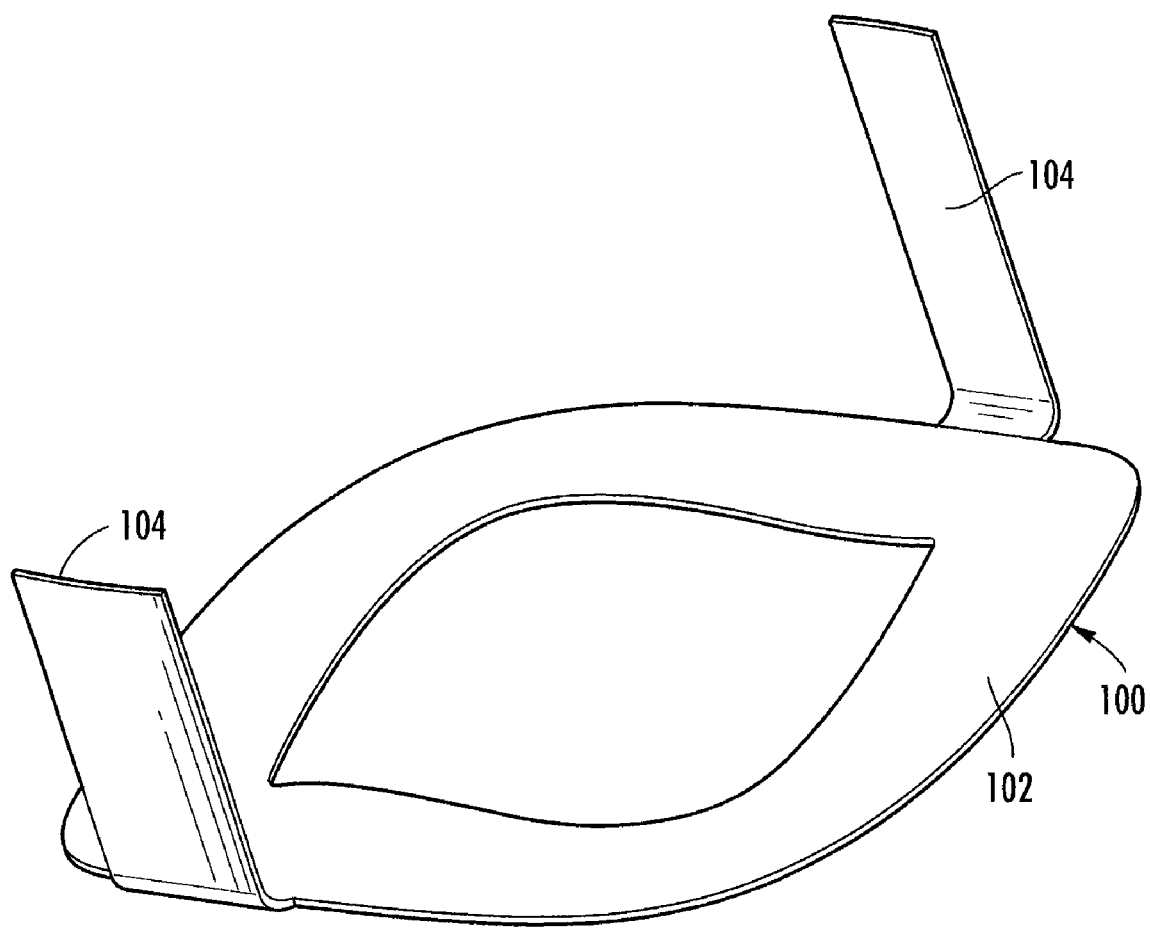
FIG. 20 is a perspective view of an embodiment of a wave washer used n the motor unit of FIG. 18.

An alternate embodiment adding friction into the system by selectively increasing or decreasing friction on one of the drums in the motor using a wave washer. FIGS. 18 through 20 show an embodiment comprising a wave washer 100 that is inserted between one of the drums and housing 60. Like numerals are used in the embodiment of FIGS. 19 through 21 to identify like components previously described with reference to the other embodiments disclosed herein. The wave washer 100 includes an annular base 102 having a wave form.

The wave washer 100 surrounds the post 70 such that the wave washer is trapped between the top of the drum and the housing 60. The wave washer 100 includes tabs 104 that extend from the base 102 such that the tabs extend through arcuate slots 106 formed in the housing 60. The tabs 104 can be gripped and the wave washer 100 rotated relative to the housing 60 such that the angular position of the wave washer 100 can be changed. In the illustrated embodiment the wave washer 100 can be rotated between one of three positions 108a, 108b and 108c and retained in position by inserting the tabs 104 into recesses 110 formed in the housing. The wave washer 100 and the housing and/or the bottom surface of the drum are formed such that as the wave washer is moved between the various positions the force exerted by the wave washer on the top surface of the drum can be increased or decreased. While three positions are shown a greater or fewer number of positions may be used. Moreover the position of the wave washer 100 may be continuously variable rather than adjusted between discrete locations. While the wave washer 100 is shown operatively engaged with a drum of the motor unit, it may also be operatively engaged with the spool 16.

Another method of adding friction into the system is to use a friction clip such as used in existing spring motors. The clip comprises a plastic insert that is movably supported on the housing. The clip can be pushed between a spool or drum to control the friction inserted into the system.

Preferably, in connection with elevating and lowering a shade panel, spring 83 is a variable force spring in which the return force is greatest when bottom rail 6 and shade panel 4 are in the raised position immediately beneath head rail 2. In this position bottom rail 6 supports the cumulative weight of the entire shade panel and thus provides the greatest load in the downward direction on the lift cords 9 and 11 and thus on motor 10. In contrast, when the shade panel is fully lowered the shade panel is suspended from head rail 2 such that the load on the lift cords 9 and 11 and thus motor 10 is primarily that of the bottom rail 16. The force of spring 83 is designed in accordance with the size of a given shade panel to facilitate elevating and lowering of base rail and shade panel with the application of minimal manual force by a person operating the window covering. The variable force characteristic of the spring 83 provides for elevating and lowering the shade panel with a substantially uniform manual force.

Figure 12:
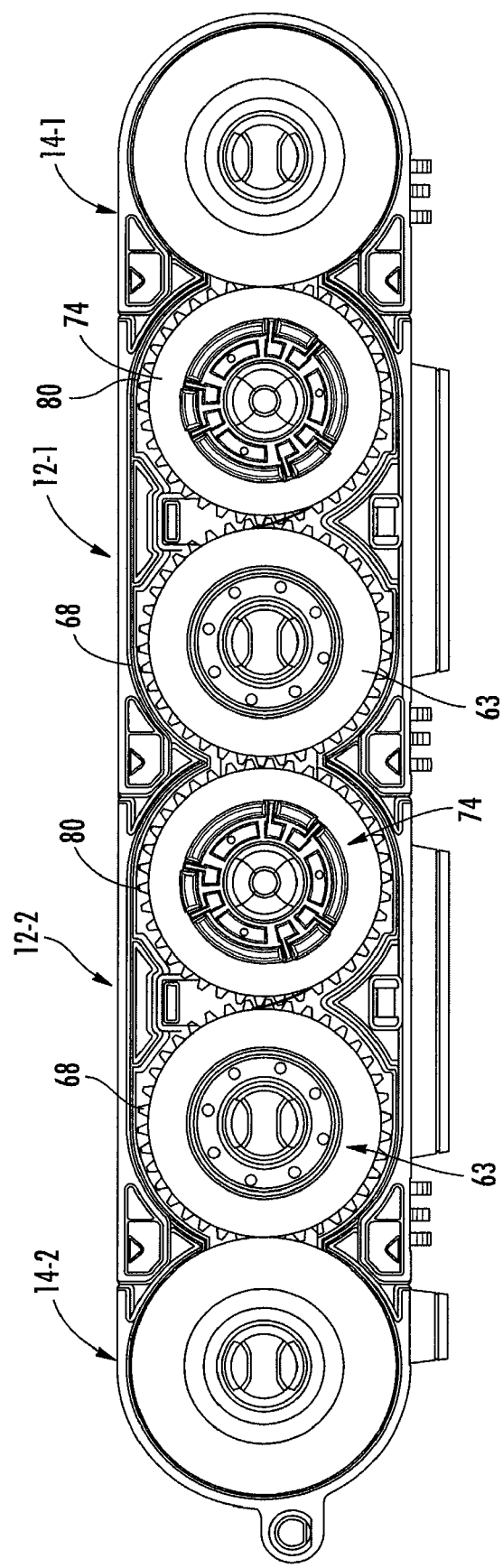
FIG. 12 is a bottom view of two motor units connected to two spool units.

With the modular construction of the motor 10 of the invention, one or more motor units 12 are connected to the spool units 14 by engaging the quick-connect coupler of the motor units 12 with the quick-connect coupler on the spool units 14. Where one motor unit 12 is used, as shown in FIG. 11, the drum gear 68 of output drum 63 engages the spool gear 31 of one of the spool units 14-1 and the drum gear 80 of storage drum 74 engages the spool gear 31 of the second spool unit 14-2. Where two or more motor units 12-1 and 12-2 are used in one motor 10, as shown in FIG. 12, the drum gear 68 of output drum 63 of one motor unit 12-1 is engaged with the drum gear 80 of the storage drum 72 of the other motor 12-2. The drum gear 80 of the storage drum 74 of the first motor unit 12-1 engages the spool gear 31 of one spool unit 14-1 and the drum gear 68 of the output drum 63 of the second motor unit 12-2 engages the spool gear 31 of the second spool unit 14-2 such that the motor units 12-1 and 12-2 are connected in series. A greater number of motor units may be added in a similar manner.

In an alternate embodiment of the spool unit 14, shown in FIGS. 8 and 9, the spool gear 33 has a smaller tooth pattern and an idler gear 90 is disposed in the spool unit 14 rotatably mounted on post 91. The idler gear 90 engages the spool gear 33 on spool 16. When the spool unit 14 is connected to a motor unit 12 the idler gear 90 engages the drum gear 80 of the storage drum 74 or the drum gear 68 of the output drum 67 of the motor unit 12. The idler gear 90 may be used with longer drops, i.e. longer window panels, to get the gear reduction needed to spool up a greater amount of cord with the same length of spring 83.

In operation, assuming bottom rail 6 of the window covering is in the raised position under rail 2 and supporting the weight of the shade panel, spring 83 of spring motor 10 in its relaxed or natural state tightly wound on storage drum 74. The load on motor 10 through cords 9 and 11 is the greatest when bottom rail 6 is in this position, and the return force tending to wind spring 83 onto the storage drum 74 is likewise the highest when the bottom rail 6 is in this position. When a person grasps bottom rail 6 and pulls down, cords 9 and 11 are extended to rotate spools 16. The meshing interengagement of the spool gears 31 (or idler gear 33) and drum gears 63 and 74 winds spring 83 onto the output drum 63 as bottom rail 16 is moved downwardly. The load on motor 10 decreases as bottom rail 6 moves downwardly and the force of spring 83 progressively decreases as the spring is wound onto output drum 63, such that the manual downward force required to lower the shade panel 4 remains substantially constant. The intermeshing gears provide for even motion of the spools 16 ensuring balanced lowering of bottom rail 6 even if the manual force is not applied directly in the center of the bottom rail. The force characteristic of spring 83 is such that the weight of bottom rail 6 and any shade panel 4 supported thereon at any particular point during lowering of the blind is slightly greater than the return force of the spring such that the bottom rail is retained at any given point of its extension below head rail 2.

When it is desired to retract or raise bottom rail 6 and shade panel 4, an upward force is manually applied to bottom rail 6 which removes the load applied on spring motor through spools 16. Accordingly, the return force of spring 83 causes the spring to rewind on storage drum 74. The spring 83 rotates both drums 63 and 74 such that the gear train is operable to rotate spools 16 to rewind cords 9 and 11 thereon. As the bottom rail 6 and shade panel 4 are raised toward head rail 2, the weight thereof progressively increases to progressively increase the load on motor 10. The force characteristic of spring 83 provides for the return force thereof to progressively increase whereby the manual force required to raise the bottom rail 6 and shade panel 4 remains substantially uniform.

Figure 13:
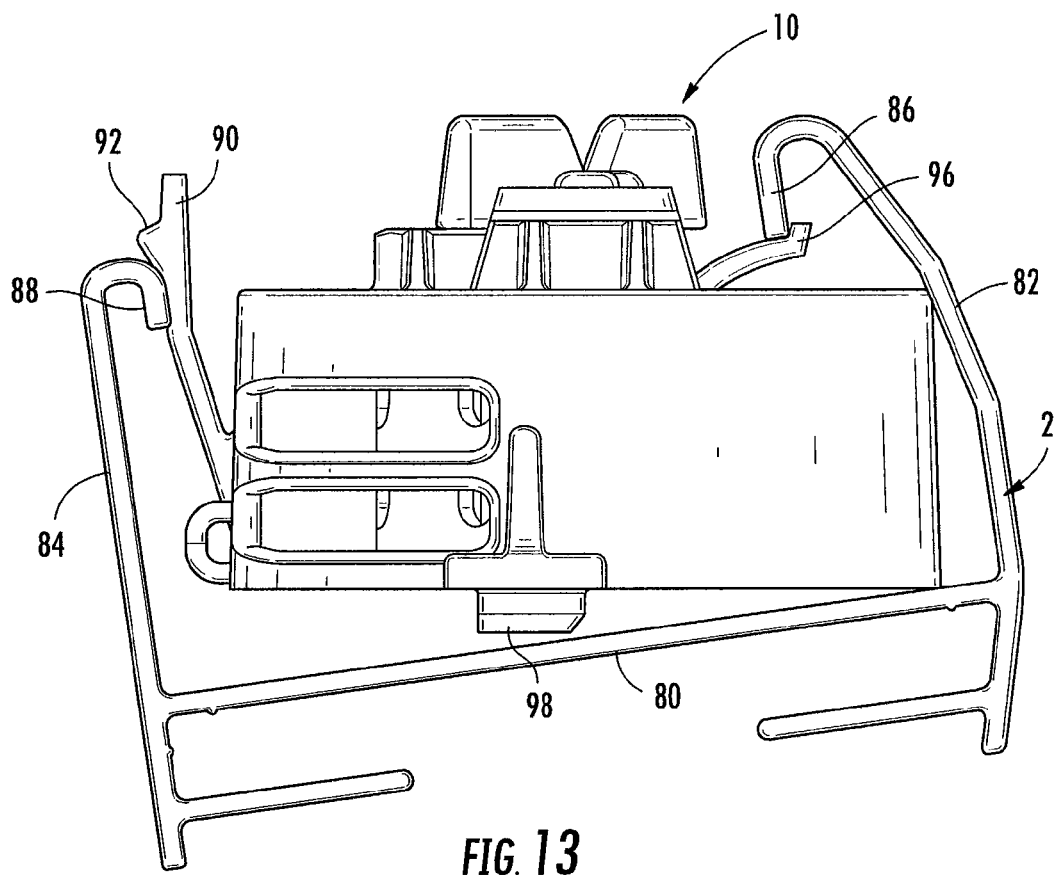
FIG. 13 is a side view of the spring motor partially inserted into a head rail.
Figure 14:
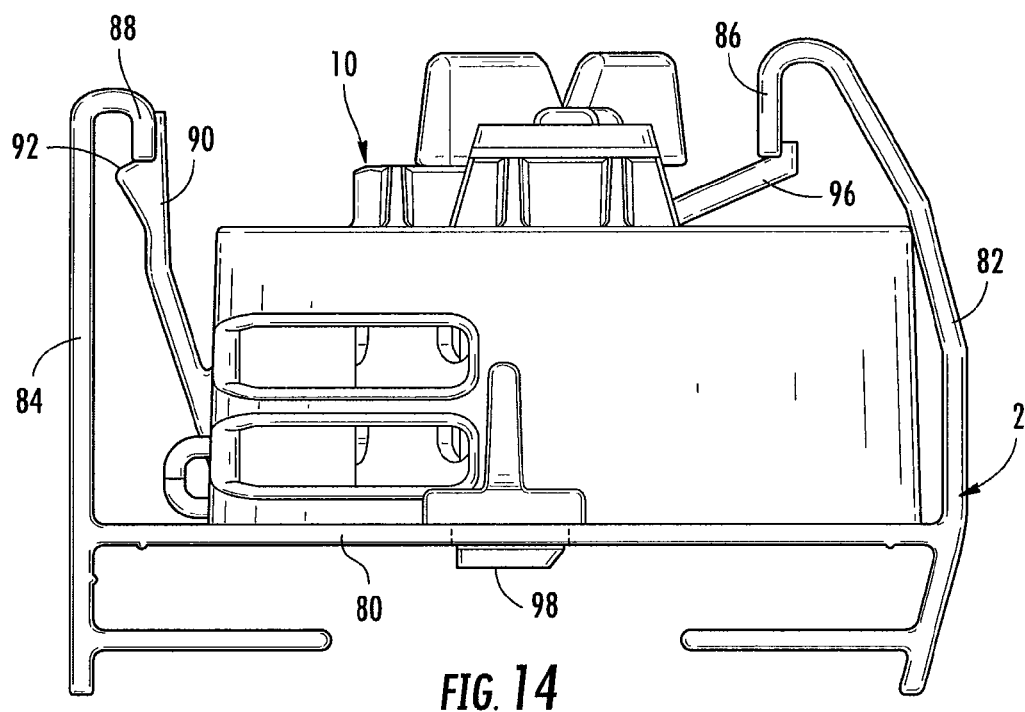
FIG. 14 is a side view of the spring motor fully inserted into a head rail.
Figure 15:
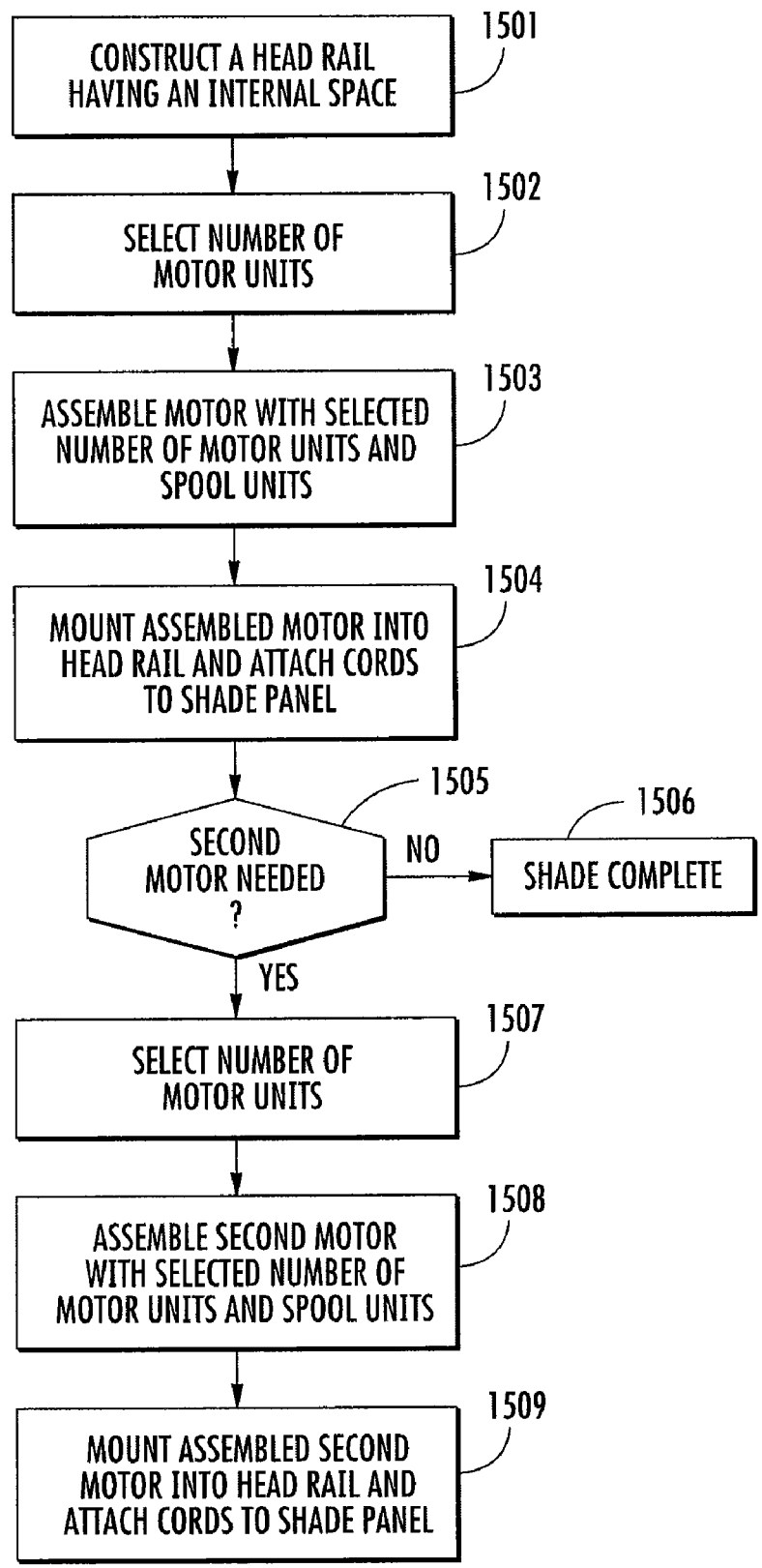
FIG. 15 is a block diagram illustrating a method of the invention.

The assembled motor 10 of the invention can be snap fit into position on the head rail 2 as will hereinafter be described. Referring to FIGS. 13 and 14 the head rail 2 comprises an elongated member having a generally U-shaped cross-section defined by a bottom wall 80, a front wall 82, and a back wall 84. The front wall 82 terminates in a downwardly extending flange 86 and the back wall 84 terminates in a downwardly extending flange 88. In one embodiment the head rail is made of steel although other rigid materials such as molded plastic may also be used.

The motor units 12 include a first locking member 90 that extends upwardly from the bottom edge of one of the side walls 60b. The locking member 90 can flex relative to the housing 60 and includes a lip 92 that extends along member 90 generally parallel to the distal edge of flange 88. A second locking member 94 extends from the top of housing 69 toward the front of the head rail (FIGS. 3 and 4). Further, a locking member 96 is formed on the top of housing 15 of spool units 14. The locking members 94 and 96 flex relative to the motor housing to create the force to lock the motor in position in the head rail 2. The locking member s may also comprise movable members biased by a separate spring. To insert the motor 10 into the head rail 2, the motor 10 is inserted into the head rail such that locking members 94 and 96 are located below the downward turned flange 86 of the front wall 82 of the head rail 2. The locking members 94 and 96 are deformed under the edge 86 to create pressure between the motor 10 and the head rail 2 tending to force the motor 10 toward the bottom wall 80. The motor 10 is forced into the head rail 2 such that flange 88 of the back wall 84 engages the locking member 90 and forces the locking member toward the housing 60. As the motor 10 is forced down into the head rail 2, the locking member 90 is deformed until lip 92 passes below the lower edge of the flange 88 as shown in FIG. 14. In this position the bottom of the motor 10 is positioned against the bottom wall 80, the front locking members 94 and 96 are trapped below the front flange 86 and the lip 92 is trapped below flange 88 to lock the motor 10 in the head rail 2. The locking member 90, 94 and 96 can be flexed such that the motor 10 can be released from the head rail 2. The spool units 14 are provided with projections 98 that are inserted into mating holes formed in the bottom wall 80 of head rail 2 to properly position the motor 10 along the length of the head rail 2. The open bottom side of motor 10 abuts bottom wall 80 of head rail 2 such that the components are completely enclosed in the housing. The motor 10 is easily snap fit into the head rail 2 without the need for tools or separate fasteners.

A method of assembling a window covering comprises constructing a head rail 2 as previously described having an internal space dimensioned to receive a motor 10 (block 1501). The number of motor units 12 to be used in the first motor is selected based on the size and type of the shade panel to be supported (block 1502). A first motor 10 is assembled having a pair of spool units 14 connected to one or more motor units 12 as selected (block 1503). The first motor is snap fit into the head rail and a cord extends from each spool unit and is attached to, or near, the bottom of the shade panel (block 1504). If a second motor is not needed (block 1505) the window covering is complete (block 1506). If a second motor is needed (block 1505), such as where the top of the shade is movable, a second motor is assembled having a pair of spool units connected to one or more motor units. The number of motor units 12 to be used in the second motor is selected based on the shade panel to be supported (block 1507). A second motor 10 is assembled having a pair of spool units 14 connected to one or more motor units 12 (block 1508). The second motor is snap fit into the head rail and a cord extends from each spool and is attached to, or near, the top of the shade panel (block 1509).

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A lift motor comprising:
   at least one motor unit comprising a first output drum and a first drum gear operatively connected to said first output drum rotatable about a first axis and a storage drum operatively connected to a second drum gear rotatable about a second axis that is parallel to the first axis wherein the first drum gear and the second drum gear engage one another, and a spring which is operatively connected between said output drum and said storage drum such that as said spring is transferred from the storage drum to the output drum by rotation of the output drum the spring creates a resisting force which causes the rewinding of said spring on said storage drum; said first output drum, said first drum gear, said storage drum, said second drum gear and said spring being supported in a motor unit housing;

a spool unit comprising a spool for winding a cord thereon rotatable about a third axis that is parallel to the first axis and a first gear operatively connected to said spool, said spool and said first gear being supported in a spool unit housing where said spool unit housing is separate from said motor unit housing;

at least one of said first output drum and said storage drum operatively connected to a second gear; and a quick-connect coupler for releasably connecting said motor unit housing to said spool unit housing such that said second gear engages said first gear when said motor unit housing is connected to the spool unit housing and rotation of said at least one of said first output drum and said storage drum rotates the spool.

2. The lift motor of claim 1 wherein said spool includes a cylinder and a plurality of flanges extending from the cylinder to create a plurality of annular channels spaced vertically over the height of the cylinder and a single cord connected to the spool such that the cord extends from a top channel of the plurality of annular channels and may be wound into all of the plurality of annular channels.

3. The lift motor of claim 1 wherein one of the first output drum and the storage drum is supported on a post having a first section separated from a second section such that the first section may be moved away from the second section to expand the size of the post to increase the friction between the post and said one of the first output drum and the storage drum.

4. The lift motor of claim 3 wherein the first section is movable away from the second section to increase the friction between the post and the spool.

5. The lift motor of claim 3 wherein the post comprises a threaded bore that receives a threaded screw.

6. The lift motor of claim 5 wherein said screw has a conical shape that tapers from a narrower distal end toward a wider end proximate the screw head such that as the screw is threaded into the threaded bore the tapered screw expands the post.

7. The lift motor of claim 5 further including set points where the screw is held in position.

8. The lift motor of claim 7 wherein the set points comprise areas of increased interference between the screw and the spool unit.

9. The lift motor of claim 2 wherein the cord is inserted through a hole formed in the cylinder and is held in a slot formed in a rib located on the inside of the spool.

10. The lift motor of claim 1 wherein the cord passes through an aperture formed in the spool unit housing.

11. The lift motor of claim 1 wherein said spring is a variable force spring.

12. The lift motor of claim 1 wherein a wave washer is used to add friction to the system.

13. The lift motor of claim 12 wherein the wave washer engages one of the output drum, storage drum or spool.

14. A window covering comprising:

a head rail supporting a motor, said motor comprising a motor unit comprising a first output drum and a first drum gear operatively connected to said first output drum rotatable about a first axis and a storage drum operatively connected to a second drum gear rotatable about a second axis that is parallel to the first axis wherein the first drum gear and the second drum gear engage one another, and a spring which is operatively connected between said output drum and said storage drum such that as said spring is transferred from the storage drum to the output drum by rotation of the output drum the spring creates a resisting force which causes the rewinding of said spring on said storage drum; said first output drum, said first drum gear, said storage drum, said second drum gear and said spring being supported in a motor unit housing, said motor unit releasably connected to a first spool unit and a second spool unit; said first and second spool units each comprising a spool winding a cord thereon rotatable about a third axis that is parallel to the first axis and a spool gear operatively connected to said spool, said spool and said spool gear being supported in a spool unit housing where said spool unit housing is separate from said motor unit housing;

said first drum gear engageable with said spool gear of the first spool unit and said second drum gear engageable with said spool gear of the second spool unit when said at least one motor unit housing is connected to said spool unit housing of the first spool unit and the second spool unit; and a shade panel supported from said head rail by the cord.

15. The window covering of claim 14 further including a second motor unit connected to said motor unit.

16. The window covering of claim 15 wherein one of said first gear or said second gear from said motor unit and said second motor unit engages the spool gear of the first spool unit and the second spool unit.

17. The window covering of claim 14 wherein an end of the cord is connected to the shade panel.

18. The window covering of claim 14 wherein an end of the cord is connected near the top of the shade panel.

19. The window covering of claim 14 wherein an end of the cord is connected near the bottom of the shade panel.

20. The window covering of claim 14 wherein the motor is snap fit directly to the head rail.

21. The window covering of claim 20 wherein the motor includes a first finger that engages a front wall of the head rail.

22. The window covering of claim 21 wherein the motor includes a second finger that engages a back wall of the head rail.

23. The window covering of claim 22 wherein said first finger and said second finger are deformable.

24. The window covering of claim 14 wherein the motor includes a projection that is inserted into a hole formed in the head rail to position the motor along a length of the head rail.

25. A method of assembling a window covering comprising:

constructing a head rail having an internal space dimensioned to receive a motor;

selecting a number of motor units to be used in a first motor each of said motor units comprising a first output drum and a first drum gear operatively connected to said first output drum rotatable about a first axis and a storage drum operatively connected to a second drum gear rotatable about a second axis that is parallel to the first axis wherein the first drum gear and the second drum gear engage one another and a spring which is operatively connected between said output drum and said storage drum such that as said spring is transferred from the storage drum to the output drum by rotation of the output drum the spring creates a resisting force which causes the rewinding of said spring on said storage drum; said first output drum, said first drum gear, said storage drum, said second drum gear and said spring being supported in a motor unit housing;

assembling said window covering by connecting at least one spool unit having a cord to the selected number of motor units each of said at least one spool unit comprising a spool for winding a cord thereon rotatable about a third axis that is parallel to the first axis and a first gear operatively connected to said spool, said spool and said first gear being supported in a spool unit housing where said spool unit housing is separate from said motor unit housing;

connecting releasably said first motor unit to said at least one spool unit by connecting the spool unit housing to the motor unit housing such that the first gear engages one of the first drum gear or the second drum gear; and inserting the first motor into the head rail such that the first motor snap fits directly to the head rail by engaging at least one flexible locking member with a wall of the head rail.

26. The method of claim 25 further including attaching the cord to the shade panel.

27. The method of claim 25 further including assembling a second motor having at least one spool unit having a second cord connected to one or more motor units.

28. The method of claim 27 further including inserting the second motor into the head rail.

29. The method of claim 27 further including attaching the second cord to the shade panel.

* * * * *